Aug. 24, 1937.    F. H. GRANT    2,091,072
APPARATUS FOR MAKING TOOTH BACKINGS
Filed March 25, 1935
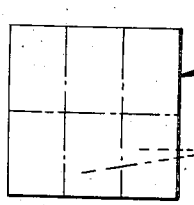
FIG.5.
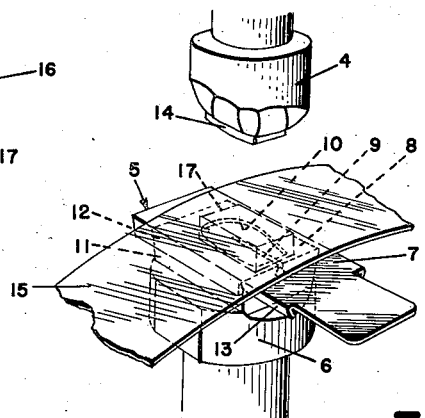
FIG.2.
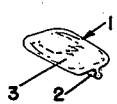
FIG.1.
FIG.3.
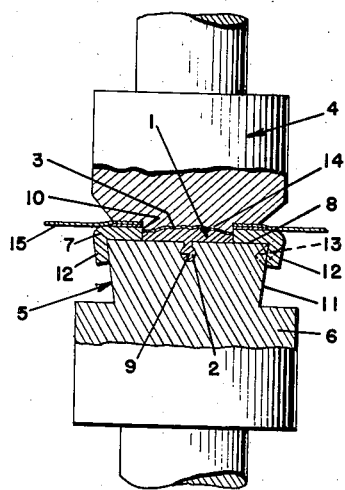
FIG.6.
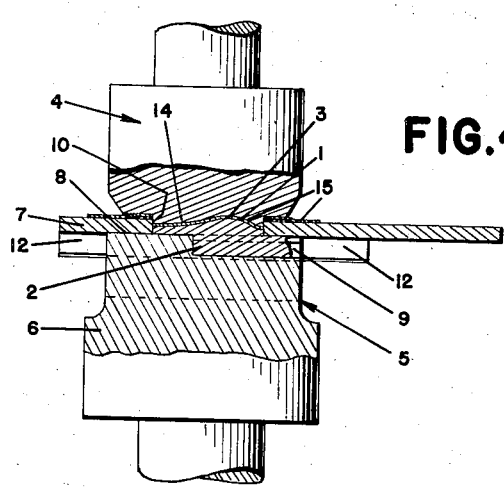
FIG.4.
FIG.8.
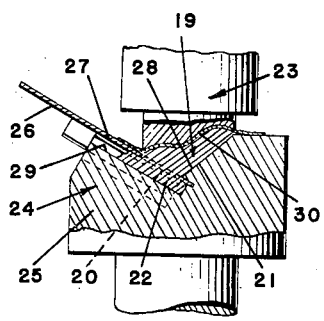
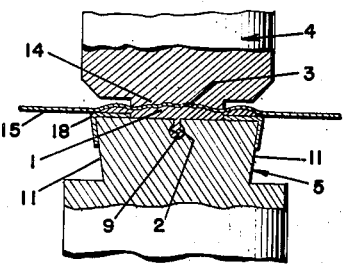
FIG.7.
Inventor
FRANCIS H. GRANT Patented Aug. 24, 1937

2,091,072

UNITED STATES PATENT OFFICE 2,091,072

APPARATUS FOR MAKING TOOTH BACKINGS

Francis H. Grant, Detroit, Mich., assignor to Detroit Dental Manufacturing Co., Detroit, Mich., a corporation of Michigan Application March 25, 1935, Serial No. 12,951

7 Claims. (Cl. 18—5.7)

The invention relates to the manufacture of patterns for use in the forming of teeth backings and refers more particularly to an apparatus for and a method of forming the patterns.

One of the objects of the invention is to provide an improved apparatus and method whereby the patterns may be readily and economically manufactured. Another object is to manufacture the patterns so that the backings formed according to these patterns will be complete and anatomically shaped.

These and other objects of the invention will become apparent from the following description, taken in connection with the accompanying drawing, in which Fig. 1 is a perspective view of a pattern made in accordance with my invention;

Fig. 2 is a perspective view of the apparatus used in the manufacture of the pattern;

Figs. 3 and 4 are transverse sections through Fig. 2 with the upper die in its lowermost position;

Fig. 5 is a plan view of a sheet used in the manufacture of the pattern;

Fig. 6 is a view similar to Fig. 3 showing another embodiment;

Fig. 7 is a perspective view of a modified pattern;

Fig. 8 is a view similar to Fig. 4 showing an apparatus for making the pattern shown in Fig. 7.

The pattern which is formed in accordance with my invention is illustrated in Fig. 1. This pattern is preferably formed of a standard dental casting wax and comprises the body 1 and the integral rib 2 which extends longitudinally centrally of the body and extends from its flat surface. The rib has an enlarged cylindrical or barrel portion at its edge and a web portion between this cylindrical or barrel portion and the flat surface of the body. The portion 3 of the pattern having the surfaces corresponding to those of the natural tooth essential to mastication and distribution of the food and also enunciation is anatomically shaped.

It will thus be seen that a backing formed in accordance with the pattern will be anatomically shaped and is so constructed that a standardized interchangeable facing may be readily secured thereto by a rectilinear movement, the facing having a groove adapted to receive the rib of the backing.

While I have illustrated a pattern for a backing of an anterior tooth, it is apparent that the invention is equally applicable to patterns for backings of posterior teeth.

Referring to Figs. 2, 3 and 4, the apparatus as illustrated comprises the upper and lower dies 4 and 5 respectively. The lower die is a compound die which comprises the die members 6 and 7. The die member 6 has the flat upper surface 8 and the longitudinal recess 9 opening into the flat upper surface and also having an open end at the front of the die member. This longitudinal recess has a shape corresponding to that of the rib 2. The die member 7 is formed of stock preferably of uniform thickness such as sheet metal and is adapted to be slidably mounted upon the die member 6 by a movement in a direction parallel to the longitudinal recess 9 and from the front of the die member 6. The die member 7 has the opening 10 therethrough which is adapted to register with the longitudinal recess 9. The opening 10 has a contour corresponding to the contour of the particular tooth in the manufacture of the backing of which the pattern is to be used. As shown in the present instance, the sides 11 of the die member 6 flare outwardly and the die member 7 has the downturned side flanges 12 which converge toward each other and which fit the sides 11. To properly position the die member 7 upon the die member 6, one of the side flanges 12 has a portion 13 which is preferably sheared from the remaining portion and bent inwardly to engage the front of the die member 6.

The upper die 4 has the projecting portion 14 which is adapted to fit within the opening 10 of the die member 7 and this projecting portion is formed with a lower imprinting surface which is recessed. This imprinting surface is formed to produce the anatomically shaped portion 3 of the pattern.

For the purpose of preventing the adherence of the fashioned blank or pattern to the upper die, there is the sheet of non-adhesive material 15 located below the upper die and engageable with the blank. This material is adapted to conform to the imprinting surface of the upper die. This sheet of material is in the nature of a strip of cellophane preferably having its lower face moist and is adapted to be successively advanced after each up stroke of the upper die.

In the manufacture of a pattern a sheet 16 of standard dental casting wax preferably of uniform thickness is severed into a number of rectangular blanks 17 having linear dimensions slightly greater than the linear dimensions of the pattern and also having a mass slightly greater than that of the pattern. These blanks are heated preferably in water to a degree, approximately 90 degrees F. in the present instance, to make the blanks semi-plastic so that they may be readily fashioned. With the die members 6 and 7 of the compound lower die 5 in properly assembled relation, one of the heated blanks is placed upon the compound die in registration with the opening 10. The upper die 4 is then moved toward the compound lower die 5 to fashion the blank, this upper die contacting with the strip of cellophane 15 and carrying the same downwardly to contact with the blank to force the material of this blank into the opening 10 and also into the longitudinal recess 9 and to anatomically shape the upper surface of the blank. Some of the excess material of the blank is forced downwardly through the open end of the longitudinal recess 9 and the fin formed above the die member 7 is sheared off by reason of the projecting portion 14 of the upper die extending into the opening 10. It is also apparent that the strip of cellophane is sheared at the same time, but inasmuch as this strip of cellophane is advanced before the next downward stroke of the upper die, it is apparent that another portion of the strip will be presented for contact with the next blank to be operated upon. The material of the blank forced outwardly through the open end of the longitudinal recess 9 is suitably removed by severing the same. The die member 7 is then removed from the die member 6 and it withdraws the fashioned blank or pattern from the die member 6. This fashioned blank or pattern is then forced from the opening 10 of the die member 7 and is ready for use in the forming of a mold cavity for casting a corresponding backing.

Instead of using a die member 7 having a thickness such that it is adapted to cooperate with an upper die 4 to shear off the fin of the blank, a die member 18 of less thickness may be used, as shown in Fig. 6. When this die member is used the blank after its formation is preferably reheated in water to a lower degree than that at which it was first heated and transferred to an apparatus in which the dies are fashioned to shear off the fin surrounding the body of the blank.

Fig. 7 illustrates another form of pattern to be used in making a backing for a Pontyx tooth. This pattern comprises the body 19 having the lower side 20 extending transversely of and preferably at an angle to the side 21. Depending from this lower side is the integral rib 22 which is formed in the same manner as the rib 2.

The apparatus used in forming this pattern, as illustrated in Fig. 8, comprises the upper and lower dies 23 and 24 respectively. The lower die 60 is a compound die, which comprises the die members 25 and 26. The die member 25 has the downwardly and inwardly converging faces 27 and 28 which together form in effect a V. The angle included between these faces is the same as that between the faces 20 and 21 of the pattern. The die member 25 also has the longitudinal recesses 29 opening into the face 27 and having an open outer end, the shape of this recess corresponding to that of the rib 22. The die member 26 is adapted to be slidably mounted upon the die member 25 and against the face 27 and is movable in a direction parallel to the recess 29. The die member 26 is formed with an opening adapted to register with the recess 29 and having a contour corresponding to the contour of the pattern immediately adjacent its lower side 20. The manner of mounting and positioning the die member 26 upon the die member 25 is the same as that previously described with respect to the die members 6 and 7. The upper die member 23 is formed in much the same manner as the upper die member 4 previously described, with the exception that its lower imprinting surface is shaped to produce the anatomically shaped portion of the pattern 19. The sheet of non-adhesive material 30 is also used in this apparatus. The die member 26 has approximately the same thickness as the die member 18 of Fig. 6, so that after the pattern blank has been removed from the apparatus, the fin surrounding the body of the blank is sheared off in much the same manner as previously described with reference to Fig. 6. The excess material which has flown out through the recess 29 is also sheared off, either before or after the removal of the fin.

What I claim as my invention is:

1. In an apparatus for forming a pattern for a tooth backing, the combination with a compound die comprising a die member having a flat surface and a longitudinal recess opening into the flat surface and having an open end, and a second die member slidably engageable with said first mentioned die member in a direction parallel to the recess, said second die member having an opening therethrough communicating with the recess, of a cooperating die having an imprinting surface.

2. In an apparatus for forming a pattern for a tooth backing, the combination with a compound die comprising a die member having a flat surface and a longitudinal recess opening into the flat surface and having an open end, and a second die member slidably engageable with said first mentioned die member in a direction parallel to the recess, said second die member having an opening therethrough communicating with the recess, of a cooperating die having a projecting portion adapted to fit the opening and formed with an imprinting surface.

3. In an apparatus for forming a pattern for a tooth backing, the combination of a compound die comprising a die member having a substantially flat surface and having a recess opening into the flat surface, a second die member supported upon the first mentioned die member and having an opening therethrough registering with the recess, and corresponding in contour to the contour of the tooth backing, and a die member cooperating with the first mentioned die member and having a projecting portion provided with an imprinting surface adapted to fit into the opening in said second die member.

4. In an apparatus for forming a pattern for a tooth backing, the combination of a compound die member comprising, a die member having a working surface and a recess opening into the working surface provided with an open end, a second die member slidably supported upon the first mentioned die member for movement in a direction parallel to the recess and having an opening therethrough, means positioning the second die member to locate a portion of the opening in the latter in registration with the recess in the first die member and to locate another portion of said opening above the working surface of the first die member, and a cooperating die having a portion provided with an imprinting surface and adapted to fit into the opening in said second die member.

5. In an apparatus for forming a pattern for a tooth backing, the combination with cooperating dies operable upon a blank, one of the dies having a working surface and having a recess opening into the working surface, the other of said dies having a portion provided with an imprinting surface, of a member supported between the cooperating dies for sliding movement relative thereto and having an opening therethrough and means for positioning said member relative to the dies with the opening in registration with the imprinted surface of the first die and with different portions of the opening respectively extending over the working surface of said first die and communicating with the recess in the first mentioned die.

6. In an apparatus for forming a pattern for a tooth backing, the combination of cooperating dies operable upon a blank, one of the dies having a working surface and having a recess opening into the working surface, the other of the dies having a portion provided with an imprinting surface, a member supported for sliding movement between the two dies and having an opening therethrough corresponding in contour to the contour of the tooth backing, means for positioning said member relative to the dies with the opening in registration with the recess in the first named die and with the imprinted portion of the second mentioned die for receiving said imprinted portion.

7. In an apparatus for forming a pattern for a tooth backing, the combination of cooperating dies operable upon a blank, one of the dies having a working surface and having a recess opening into the working surface, another of the dies having a portion provided with a projecting imprinting surface, a member positioned between the two dies and adapted to support a sheet of non-adhesive material on the top surface thereof, said member having an opening therethrough corresponding in contour to the contour of the tooth backing and registering with the recess in the first die, said opening adapted to receive the projecting imprinting surface of the second die upon relative movement of the dies toward each other to cooperate with the first die in shearing the non-adhesive material to the contour of the tooth backing.

FRANCIS H. GRANT.